Patented June 6, 1933                                           1,912,807

UNITED STATES PATENT OFFICE

GIUSEPPE VENOSTA, OF MILAN, ITALY, ASSIGNOR TO SOCIETÁ ITALIANA PIRELLI, OF MILAN, ITALY

PROCESS FOR THE MANUFACTURE OF STRUCTURES WHOLLY MADE OF RUBBER

No Drawing. Application filed May 28, 1931, Serial No. 540,559½, and in Italy June 7, 1930.

The present invention relates to a process for manufacturing structures wholly made of rubber without any adoption of fibrous materials, nor fabrics or other reinforcements of whatsoever kind, but only and exclusively rubber i. e. materials which composition include pure india rubber either admixed with sulphur or with other ingredients such as reclaims, factices, softeners, other mineral and organic ingredients used and which may be used in the rubber industry.

This process may be used for manufacturing articles of whatsoever shape such as bands or cords, conveyer belts, sleeves, rings, tyre casings, shock absorbers, hoses, tubes and the like.

An important feature of the present invention is to provide means for obtaining rubber articles in which the properties of rubber are utilized at the most in every zone of the structure in relation with the strain applied.

It is well known that rubber has peculiar elastic properties different from the general features shown by other materials. If stress-strain curves, are plotted, it may be observed that the stress-strain curve of vulcanized rubber subjected to elongation and compression shows in the first stage a high degree of extension in respect to little variation of load while in the second stage is the reverse.

It follows then that when structures are required which are capable of resisting the stresses of compression or tension of different nature in the different zones, it is necessary that the whole structure presents in said zones, different elastic states. E. g. in elastic structures which must resist the stress of tension the part wholly made of rubber is incapable of resisting the strains to which the structure in usage is subjected, therefore it is necessary to insert in the rubber, layers of cotton fabric, silk or other textile fibers which latter having little extension are called to withstand the principal strains and serve also to confine the extension of the rubber layers which alone would not be capable of resisting under the stress required by the structure, and in any case would give rise to such an extension and consequently so stretched that their use would be practically impossible, as the rigidity of rubber even when compounded is too scanty and its extensibility too high; on the other hand it is known that rubber when stretched has less resistance to cuts, punctures, abrasion. E. g. in conveyor belts made of rubber and fabric all the pulling forces are practically considered applied on the fabric.

Certain rubber articles are required to have a limited degree of elasticity, such as bands, rings, and the like. Heretofore such types of structures were obtained by coupling rubber with inextensible materials e. g. threads of textile materials. In such a manner there are manufactured e. g. elastic fabrics for braces, garters.

In the manufacture of structures working under compression e. g. shock absorbers it is useful that even at higher loads deformations increase with a certain rapidity which is only obtained by varying the peculiar qualities of the various layers composing the structures.

The object of my present invention is to obtain structures wholly made of rubber, without any adoption of foreign reinforcement, the different zones of which work under different elastic conditions in accordance with the different stress and is characterized by the fact that the structure is obtained by juxtaposing different layers of rubber each of them having been previously vulcanized at the required degree and at the moment of its application suitably stretched in order to obtain the desired result, the adhesion between the different layers being obtained by cementing rubber solutions capable of vulcanizing.

According to the process of my present invention the textile structures are replaced with rubber layers previously vulcanized by any known vulcanization process, after having been stretched to the required degree and in such a condition cemented to other layers of rubber crude or semivulcanized or vulcanized, in neutral condition, that is neither stretched nor compressed or stretched to a degree of extension lower than that of the above said layers.

Such a vulcanization may be carried out even at room-temperature if the layers subsequently added are already vulcanized and if the rubber cements used for their adhesion are self-vulcanizing.

It follows then, that the stretched layers which, after the vulcanization of the whole structure have a tendency to regain their early condition, are partially prevented by the unstretched layers thus attaining the double scope of having some layers of rubber working in the elastic conditions in which their extensibility is at the minimum and consequently affording a high rigidity, while other layers are contracted and then in the best condition of resisting to cuts, perforations, abrasion and the like.

In order that the elastic structures so built may show good properties it is convenient that the vulcanizing solutions used for cementing together the different layers of rubber be rapidly vulcanizing that is vulcanizing at low temperature (even at room temperature); even in the case when the layers, have low distension properties, it is convenient they vulcanize in a short time at a temperature not too high or at a low temperature, otherwise the vulcanized layer under tension may partially lose its elasticity and the whole structure so obtained cannot completely afford the above said features.

The elastic structures herein described are well differentiated and quite unlike as to their process of manufacture and the final product from some articles which at first sight may resemble them and already known for their adoption in manufacturing hollow articles e. g. inner tubes for pneumatic tyres. It has been proposed in fact, in order to render inner tubes puncture-proof, to manufacture them with two or more layers of vulcanized rubber of which one at least be kept compressed by the other in stretched condition and which acts to seal the holes produced by nails or other sharp edged articles.

In order to make clearer the scope of my present invention and its manifold possible applications there are disclosed hereunder several examples of its application which however are not limitatives but only explicatives.

An elastic cord e. g. may be manufactured as follows: Upon a rubber core previously vulcanized and stretched is fitted a rubber hose which if crude is in neutral condition or if vulcanized or semivulcanized may be slightly stretched. The whole is vulcanized and thereafter the core is removed from the apparatus which till vulcanization maintains the core under tension. It is understood that in order to obtain a good adhesion between the core and the hose fitted upon it the usual manner of manufacture must be conveniently observed, that is the surfaces, when it deals of vulcanized layers, should be scraped or rubbed and cleaned with benzine before spreading upon them the solution of crude rubber which will serve for the adhesion. Even the rubber quality of the different layers may vary from one to the other.

If desired, upon the cores may be fitted several hoses observing the same rules followed in the application of the first hose, then vulcanizing the whole structure obtained; the resulting structure has a central core in stretched condition and consequently highly rigid while the outer surface is contracted and then as already stated in the best working condition.

Transmission belts and conveyer belts, presently used are built up by one or more rubberized inner layers of cotton fabric, hemp or other textile fibres having an outer covering of rubber. Instead of the inner layers of rubberized fabric, according my present invention are used one or more sheets of rubber, more or less thick, under tension and previously vulcanized and around them, kept in tension by means of a suitable device, there are wound one or more sheets of rubber in crude condition or semi-vulcanized or completely vulcanized in stretched or neutral condition or at a degree of tension lower than that of the inner sheets, interposing between the different layers a coat of self-vulcanizing rubber solution and vulcanizing then the whole.

According to the above method endless belts or bands of whatsoever length may be manufactured. Of course the thickness of the inner sheet, the number and thickness of the outer sheets and their degree of tension may vary according to the size of the belt and the quality of the rubber stock used. Even in this case the state of tension of the outer layer is of benefit to the life of the belt.

For the manufacture of ring shaped structures of whatsoever cross section and presenting a determined and suitably reduced elasticity similar processes may be followed. Thus e. g. a ring of elastic rubber having a circular cross section, is manufactured in any suitable manner, then partially or completely vulcanized in a mould or the like and thereafter by means of a suitable device it is stretched to the required degree according to the elastic properties that the finished articles must possess; while the ring is in stretched condition it is covered with a tape or a sheet of elastic rubber more or less vulcanized after having spread its surfaces with a coating of rubber solution self-vulcanizing or vulcanizing in very short time. The product or article so obtained is placed in a vessel wherein vulcanization is completed or it is kept in stretched condition for the time required to allow the adhered surfaces to stick together, after which the ring is removed from the tensioning device and is ready for use.

The result of said process of manufacture is a structure the core of which prevents the outer layer from regaining the neutral condition and consequently it keeps said layer in the desired degree of distension while in its turn the outer layer will remain contracted.

Another process of manufacture chiefly suitable when the section of the ring is not circular, may be the following:

A sheet of elastic rubber of suitable thickness obtained on the calender or on the mill is wound upon a metallic cylinder of a determined diameter, its ends joined together and vulcanized. After vulcanization the sheet is removed from the cylinder and widened by means of a suitable device fitted upon another cylinder having a larger diameter around which has already been disposed a sheet of semivulcanized rubber in neutral condition i. e. neither stretched nor contracted; upon said sheet is then wound another sheet of semi-vulcanized rubber in the same condition as the former. The faced surfaces of the three sheets are spread, before vulcanization, with a coating of rubber solution vulcanizing in a very short time. The product so obtained is then placed in a vessel and completely vulcanized, after which is removed from the metallic cylinder and then fitted upon a cylinder of wood whereupon by means of a circular saw is cut into rings of the desired width.

Like structures could also be obtained by following other processes somewhat different from those above disclosed.

Thus for instance the outer layer of rubber may even be completely in crude state, having care however in this case to use rubber vulcanizing in a very short time as a long permanency in the vulcanization vessel could spoil the inner core already vulcanized or said layer may be completely vulcanized obtaining then its adhesion to the inner core by means of a suitable vulcanizing solution.

The inner core instead of being a ring having solid cross section, could be made by the union of rubber threads of whatsoever suitable cross section. Besides the ring or band may be covered with a sheath of fabric which besides to improve the external appearance of the article prevents the core from becoming spoiled by the action of shock, rubbing action caused by other objects and also protect against the light.

The degree of distension of the inner core must be determined according to final degree of elasticity which is required from the finished ring; this may be attained also covering the inner core, in stretched condition, with different layers already vulcanized and brought to a degree of distension gradually decreasing towards the outerside. Even the last layer whenever required on account of the final properties, which the article obtained must possess, could be slightly stretched.

Rings and sleeves manufactured according to the processes disclosed may find application also as shock absorbers. In several cases however articles for these purposes require special exigencies e. g. that of possessing remarkable deformations even at elevated loads. Such exigency may be met by using a rubber core eventually vulcanized till the required degree and eventually suitably stretched.

Said rubber core eventually vulcanized to the required degree and eventually previously stretched is covered with at least one stretched layer of rubber vulcanized to the required degree, eventually interposing between the layers of the covering and between said layers and the core, a suitable solution of rubber as the cementation or adhesion together of the different layers is obtained by subsequent vulcanization.

It will be seen that by forming the structure wholly made of rubber the different degrees of the initial tension of the core and of the covering sheet may be obtained. In fact varying the rate between the diameter of the inner core (which at the limit may even be reduced to zero) and the total thickness and the initial tension of the different layers placed upon it also the stress-strain curves obtained relating to deformations along the vertical axis of the structure may be broadly varied according to the requirements of the maker of aeroplanes or of other apparatus where the shock absorber may find useful application.

Thus by way of example a central core, with a coating of vulcanizing rubber solution may be wound with several rounds of a sheet of rubber vulcanized to the required degree, under tension and having its two surfaces spread with rubber solution; during the winding the core may be kept under tension, in such a case however it should be previously vulcanized to the required degree.

The core may also be covered following another method, that is fitting upon it a sleeve of rubber vulcanized to the required degree, and having a hole whose diameter is shorter than that of the core upon which it is to be fitted. The operation of fitting the sleeve upon the core is carried out by widening the former by means of any suitable device.

Whenever the different parts constituting the shock absorber are in crude condition or semivulcanized the adhesion of one to the other, in all the mentioned cases is obtained by completing the vulcanization according one whatsoever of the method usually used. When presumed necessary or useful also in these cases the surfaces may be spread with a vulcanizing rubber solution. The inner core could also be pierced along its axis or whenever required from the apparatus on which it must be fitted, several holes placed round its longitudinal axis may be provided.

Instead of shock absorbers of the required length, cord or bands having remarkable length may be manufactured and from them cut the required lengths to be used as shock absorbers.

The present process, it is to be understood, may be readily employed for forming rubber articles of various kinds and description, and such changes may be made as fall within the purview of one skilled in the art without departing from the spirit of the invention and the scope of the appended claims.

What I claim is:

1. The process of manufacturing rubber articles composed solely of rubber which consists in forming the articles of layers of vulcanized rubber, stretching each layer to a predetermined elastic degree and cementing the layers together whereby each zone of the article is in the most suitable elastic condition to resist the strains to which it may be subjected.

2. The process of manufacturing rubber articles composed solely of rubber which consists in forming the articles of layers of vulcanized rubber, stretching each layer to a predetermined elastic degree, applying the layers together and cementing the outer layer to a layer of unstretched and uncompressed rubber whereby each zone of the article is in the most suitable elastic condition to resist the strains to which it is subjected in use.

3. The process of manufacturing rubber articles composed solely of rubber which consists in applying to a vulcanized stretched rubber core, a layer of rubber which has been previously vulcanized and stretching the latter during application to the core to a predetermined elastic degree whereby each zone of the article thus formed is in the most suitable elastic condition to resist the strain under which it is subjected during usage.

4. A process of manufacturing rubber articles composed solely of rubber which consists in applying to a vulcanized stretched rubber core under tension, layers of rubber which have been previously vulcanized and stretched to a degree substantially lower than that of the core, the surfaces of the layers being previously coated with a cementing rubber solution whereby each zone of the article thus formed is in the most suitable elastic condition to resist the strain to which it is subjected in use.

5. A process of manufacturing hollow rubber articles which consist in vulcanizing the inner layer, then stretching the inner layer to the desired elastic degree, applying a coating of rubber solution to a strip or sheet of elastic rubber and winding the latter around the inner layer subjecting the article thus formed to pressure to cause the contact surfaces to adhere, and then withdrawing the pressure whereby the inner layer is maintained in a stretched condition and the outer layer in a contracted condition.

6. The process of manufacturing hollow rubber articles which consists in winding a sheet of elastic rubber on a cylinder joining the ends of the sheet together and vulcanizing the sheet, winding another sheet of semi-vulcanized rubber on a cylinder of larger diameter than the first cylinder, applying the first sheet to the second cylinder, wrapping the first sheet with a third sheet of semi-vulcanized rubber, the surfaces of the sheets being previously coated with a rubber vulcanizing solution before being applied to one another, vulcanizing the article thus formed and then removing the cylinder therefrom.

7. The process of manufacturing hollow rubber articles which consists in winding a sheet of elastic rubber on a cylinder joining the ends of the sheet together and vulcanizing the sheet, winding another sheet of semi-vulcanized rubber on a cylinder of larger diameter than the first cylinder, applying the first sheet to the second cylinder, wrapping the first sheet with a third sheet of semi-vulanized rubber, the surfaces of the sheets being previously coated with a rubber vulcanizing solution before being applied to one another, vulcanizing the article thus formed, covering the exposed sheet with a fabric, and then removing the cylinder.

8. The process of manufacturing rubber articles composed solely of rubber which consists in forming the articles of layers of rubber prevulcanized to a predetermined degree; stretching at least one layer to a predetermined elastic degree; cementing the layers together whilst in stretched condition; completing the vulcanization; and finally removing the tension whereby each zone of the article is in the most suitable elastic condition to resist the strains to which it may be subjected.

9. The process of manufacturing rubber articles composed solely of rubber which consists in forming the articles of layers of vulcanized rubber; stretching at least one layer to a predetermined elastic degree; cementing the layers together whilst in stretched condition; completing the vulcanization; and finally removing the tension whereby each zone of the article is in the most suitable elastic condition to resist the strains to which it may be subjected.

10. The process of manufacturing rubber articles composed solely of rubber which consists in cementing to each surface of a stretched layer of vulcanized rubber a layer of unstretched rubber prevulcanized to a predetermined degree, completing the vulcanization and removing the tension whereby each zone of the article is in the most suitable elastic condition to resist the strains to which it may be subjected.

11. The process of manufacturing rubber articles composed solely of rubber which consists in cementing to each surface of a stretched layer of rubber a layer of unstretched rubber prevulcanized to a predetermined degree, completing the vulcanization and removing the tension whereby each zone of the article is in the most suitable elastic condition to resist the strains to which it may be subjected.

12. The process of manufacturing rubber articles composed solely of rubber which consists in cementing to each surface of a stretched layer of vulcanized rubber a layer of rubber prevulcanized at a predetermined degree and stretched to a degree substantially lower than that of the former, completing the vulcanization and removing the tension whereby each zone of the article is in the most suitable elastic condition to resist the strains to which it may be subjected.

13. The process of manufacturing rubber articles composed solely of rubber which consists in cementing to a vulcanized stretched rubber core, a tubular layer of rubber which has been previously vulcanized to a predetermined degree, completing the vulcanization and removing the tension whereby each zone of the article is in the most suitable elastic condition to resist the strains to which it may be subjected.

14. The process of manufacturing rubber articles composed solely of rubber which consists in cementing to a vulcanized stretched rubber core a tubular layer of rubber which has been previously vulcanized to a predetermined degree, and stretched to a degree substantially lower than that of the former, completing the vulcanization and removing the tension whereby each zone of the article is in the most suitable elastic condition to resist the strains to which it may be subjected.

15. A process of manufacturing hollow rubber articles which consists in vulcanizing the inner core, then stretching the inner core to a desired elastic degree, applying a coating of rubber vulcanizable solution to a strip or sheet of elastic rubber prevulcanized to a predetermined degree, winding the latter around the inner core, subjecting the article thus formed to vulcanization, and removing the tension whereby the inner core is maintained in a stretched condition and the outer layer in a contracted condition.

16. The process of manufacturing laminated articles made solely of rubber which consists in applying layers of pure rubber to a rubber core, cementing the parts together, and subjecting the whole to a tensioning action, and vulcanizing the article thus formed.

In testimony whereof I have hereunto set my hand.

GIUSEPPE VENOSTA.